(12) United States Patent
Starr et al.

(10) Patent No.: US 7,171,571 B2
(45) Date of Patent: Jan. 30, 2007

(54) ROBOTIC DATA STORAGE LIBRARY WITH SOFT POWER ON/OFF CAPABILITY

(75) Inventors: Matthew T. Starr, Lafayette, CO (US); Michael G. Goberis, Broomfield, CO (US); Kenneth D. Lau, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 372 days.

(21) Appl. No.: 10/604,971

(22) Filed: Aug. 28, 2003

(65) Prior Publication Data

US 2005/0047258 A1 Mar. 3, 2005

(51) Int. Cl.
*G06F 1/26* (2006.01)
*G06F 11/30* (2006.01)

(52) U.S. Cl. .................................. 713/320; 713/340
(58) Field of Classification Search ................ None
See application file for complete search history.

(56) References Cited

U.S. PATENT DOCUMENTS

| | | | | |
|---|---|---|---|---|
| 4,204,249 A | * | 5/1980 | Dye et al. .................. | 713/330 |
| 5,429,470 A | * | 7/1995 | Nicol et al. ............. | 414/331.05 |
| 5,673,412 A | | 9/1997 | Kamo et al. ............... | 395/441 |
| 5,815,409 A | * | 9/1998 | Lee et al. ................. | 700/286 |
| 6,012,124 A | | 1/2000 | Kamo et al. ............... | 711/114 |
| 6,131,142 A | | 10/2000 | Kamo et al. ............... | 711/114 |
| 6,286,108 B1 | | 9/2001 | Kamo et al. ............... | 713/330 |
| 6,366,987 B1 | * | 4/2002 | Tzelnic et al. ............. | 711/162 |

(Continued)

FOREIGN PATENT DOCUMENTS

WO   WO2005/010661 A2   2/2005

OTHER PUBLICATIONS

Overland Storage, Neo 8000 product literature, web pages at http://www.neo8000.com, date of publication—unknown, Overland Storage, Inc., San Diego, USA.

(Continued)

*Primary Examiner*—James K Trwillo
*Assistant Examiner*—Stefan Stoynov

(57) ABSTRACT

A robotic data storage library with soft power on/off capability and a method for providing soft power capability in a robotic data storage library are disclosed. The method and apparatus control the application of power to at least one component of a robotic data storage library to reduce issues caused by transitioning the library between an ON state and an OFF state. One embodiment of a robotic data storage library, for example, comprises: (a) a plurality of storage locations, each capable of holding at least one data storage element; (b) a data transfer interface for receiving a data storage element and establishing a communication path with a data storage element so that data can be transferred between the data storage element and a host computer; (c) a transport unit for moving a data storage element between one of the plurality of storage locations and the data transfer interface; (d) a power supply for providing power to a component of the library; (e) a power switch switchable between an ON state and an OFF state; and (f) a power controller for monitoring the power switch for a transition between the ON state and the OFF state and after detecting a transition of the power switch between the ON state and the OFF state, controlling the application of power to the component.

31 Claims, 10 Drawing Sheets

U.S. PATENT DOCUMENTS

| | | | |
|---|---|---|---|
| 6,397,294 B2 | 5/2002 | Kamo et al. | 711/114 |
| 6,574,740 B1 * | 6/2003 | Odaohhara et al. | 713/323 |
| 6,885,911 B1 * | 4/2005 | Smith | 700/245 |
| 2002/0091807 A1 * | 7/2002 | Goodman | 709/221 |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Arnagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0057847 A1 | 3/2005 | Armagost et al. | |
| 2005/0063089 A1 | 3/2005 | Starr et al. | |
| 2005/0065637 A1 | 3/2005 | Lantry et al. | |
| 2005/0185323 A1 | 8/2005 | Brace et al. | |
| 2005/0195517 A1 | 9/2005 | Brace et al. | |
| 2005/0195518 A1 | 9/2005 | Starr et al. | |
| 2005/0195519 A1 | 9/2005 | Kumpon et al. | |
| 2005/0195520 A1 | 9/2005 | Starr et al. | |
| 2005/0219964 A1 | 10/2005 | Pollard et al. | |
| 2005/0246484 A1 | 11/2005 | Lantry et al. | |
| 2005/0267627 A1 | 12/2005 | Lantry et al. | |

OTHER PUBLICATIONS

U.S. Appl. No. 10/950,613, Starr et al.
U.S. Appl. No. 10/951,321, Wong.
PCT Application No. US05/45168, Spectra Logic Corporation.
PCT Application No. US05/46447, Spectra Logic Corporation.

* cited by examiner

ROBOTIC DATA STORAGE LIBRARY WITH SOFT POWER ON/OFF CAPABILITY

FIELD OF THE INVENTION

The present invention is directed to a robotic data storage library that is useful in writing data to a data storage element and/or reading data from such a data storage element.

BACKGROUND OF THE INVENTION

Presently, robotic data storage libraries are primarily used to archive data, i.e., store data that is not immediately needed by a host computer, and provide archived data to the host computer when the data is needed. A typical robotic data storage library receives data from a host computer and causes the data to be written to a recording medium of a data storage element. When the host computer requires some of the data that was previously written to a data storage element, a request for the data is sent from the host computer to the library. In response, the library locates the data storage element, reads the data from the data storage element, and transmits the data to the host computer system.

Most robotic data storage libraries are currently comprised of: (a) a plurality of storage locations for holding the data storage elements; (b) a data transfer interface capable of establishing a communication path with a data storage element so that data can be transferred between the data storage element and the host computer; and (c) a transport unit for moving a data storage element between one of the storage locations and the data transfer interface.

One example of a robotic data storage library is a tape cartridge library. In a tape cartridge library, for example, the library comprises a plurality of shelf structures comprising slots for holding tape cartridges, a drive for writing data to and/or reading data from the tape housed in the tape cartridges and a robot for transporting the tape cartridges between the storage slots and the tape drive. When a host computer provides data for archival purposes to the tape cartridge library, the robot retrieves a tape cartridge from a storage slot and transports the tape cartridge to the drive. The drive writes the data onto the tape in the tape cartridge. When the drive has completed writing the data onto the tape, the robot retrieves the tape cartridge from the drive and places the tape cartridge into a storage slot for later access.

When the host computer requests the archived data, the tape cartridge library locates the tape cartridge in which the requested data is stored. The robot retrieves the tape cartridge from a storage location and transports the tape cartridge to a drive. The drive reads the data from the tape in the tape cartridge and the tape cartridge library provides the data to the host computer. After the data has been read from the tape in the tape cartridge, the robot retrieves the tape cartridge from the drive and transports the tape cartridge to a storage slot.

In addition, the components of a robotic data storage library require the application of power. As such, a robotic data storage library further comprises one or more power supplies for supplying power to components of the library.

SUMMARY OF THE INVENTION

Powering up or powering down a robotic data storage library can cause a variety of issues. The present invention controls the application of power to at least one component of a robotic data storage library to reduce issues caused by transitioning the library between an ON state and an OFF state. For example, a robotic data storage library of the present invention comprises: (a) a plurality of storage locations, each capable of holding at least one data storage element; (b) a data transfer interface for receiving a data storage element and establishing a communication path with a data storage element so that data can be transferred between the data storage element and a host computer; (c) a transport unit for moving a data storage element between one of the plurality of storage locations and the data transfer interface; (d) a power supply for providing power to a component of the library; (e) a power switch switchable between an ON state and an OFF state; and (f) a power controller for monitoring the power switch for a transition between the ON state and the OFF state and after detecting a transition of the power switch between the ON state and the OFF state, controlling the application of power to the component.

Transitioning a robotic data storage library from an OFF state to an ON state can create large AC current influxes that can be difficult to handle. To address these large AC current influxes, the application of power to a component of the library is delayed. For example, one embodiment of a robotic data storage library having soft power capability to reduce AC current influxes comprises: (a) a plurality of storage locations, each capable of holding at least one data storage element; (b) a data transfer interface for receiving a data storage element and establishing a communication path with a data storage element so that data can be transferred between the data storage element and a host computer; (c) a transport unit for moving a data storage element between one of the plurality of storage locations and the data transfer interface; (d) a power supply for providing power to a component of the library; (e) a power switch switchable between an ON state and an OFF state; and (f) a power controller for monitoring the power switch for a transition from the OFF state to the ON state and after detecting a transition of the power switch from the OFF state to the ON state, delaying the application of power to the component for a period of time after detection of the transition of the power switch from the OFF state to the ON state. The application of power to the component is delayed in one embodiment, for example, by sequencing the power supply with at least one other power supply of the library or in another embodiment by sequencing the activation of the component with at least one other component of the library.

Transitioning a robotic data storage library from an ON state to an OFF state can, for example, leave components in an undesired physical position requiring operator intervention when the library is powered on again, interrupt pending operations, and erase data stored in volatile memory. In one embodiment, soft power capability is provided to allow a component to reach a quiescent state before the application of power to the component is terminated. For example, a robotic data storage library having soft power capability to allow a component to reach a quiescent state before the application of power is removed comprises: (a) a plurality of storage locations, each capable of holding at least one data storage element; (b) a data transfer interface for receiving a data storage element and establishing a communication path with a data storage element so that data can be transferred between the data storage element and a host computer; (c) a transport unit for moving a data storage element between one of the plurality of storage locations and the data transfer interface; (d) a power supply for providing power to a component of the library; (e) a power switch switchable between an ON state and an OFF state; and (f) a power controller for monitoring the power switch for a transition from the ON state to the OFF state and after detecting a transition of the power switch from the ON state to the OFF state, issuing a power termination message to the component concerning an impending termination of the application of power to the component.

In one embodiment, a system of the present invention terminates the application of power to a component after detecting a transition of the power switch from an ON state to an OFF state after a fixed amount of time has expired after since the detection of the transition.

In an alternative embodiment, a system of the present invention terminates the application of power to a component after detecting a transition of the power switch from an OFF state to an ON state after a variable amount of time has expired since the detection of the transition.

In another embodiment, a robotic data storage library system is powered on or powered off after a predetermined or operator selectable period of time.

DETAILED DESCRIPTION

The present invention is directed to a system, method and apparatus for providing soft power capability for a robotic data storage library.

Figure 1:
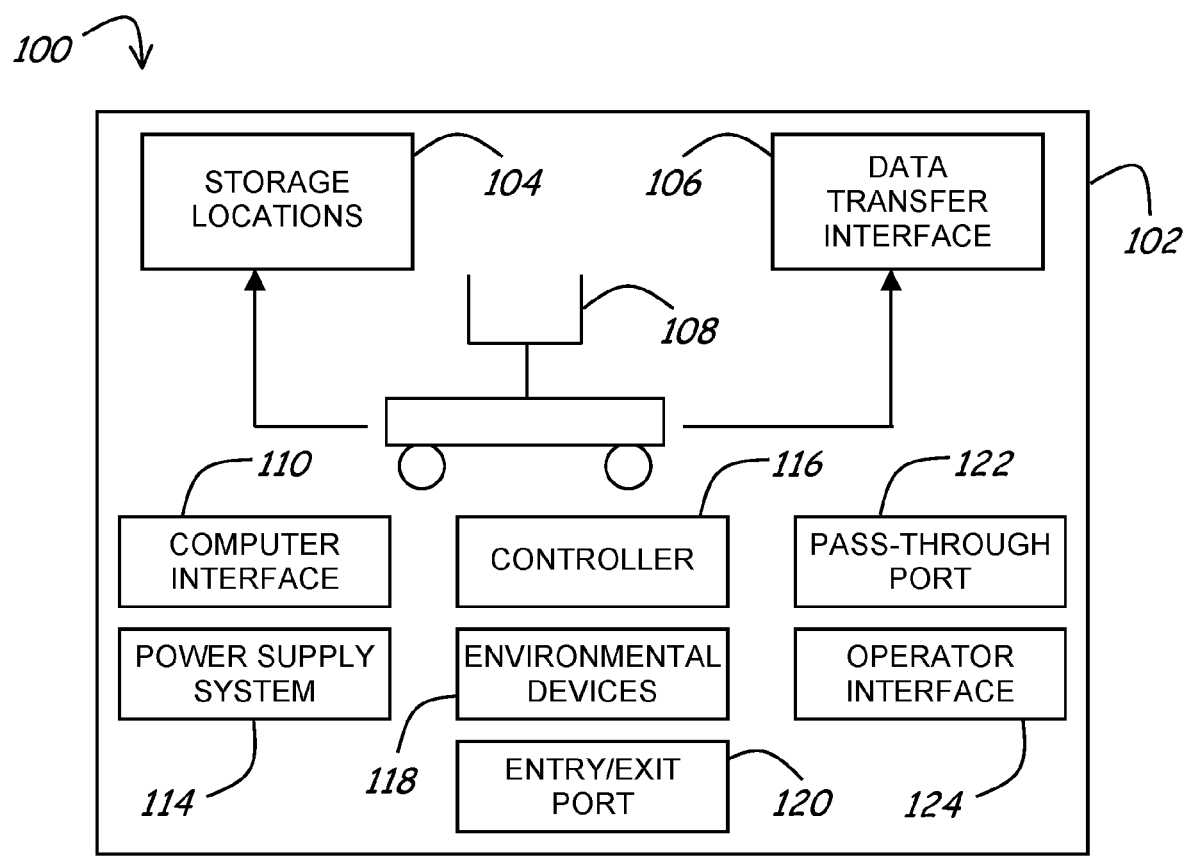
FIG. 1 shows a block diagram of a robotic data storage library.

FIG. 1 shows a block diagram of a robotic data storage library. The robotic data storage library 100 comprises: (a) a frame 102 for supporting other elements of the library, (b) a plurality of storage locations 104, each capable of storing data storage elements; (c) a data transfer interface 106 for receiving a data storage element and establishing a communication path with the data storage element so that data can be transferred between the data storage element and a host computer; (d) a transport unit 108 for moving a data storage element between one of the plurality of storage locations 104 and the data transfer interface 106; and (e) an interface 110 for communicating with a host computer that uses the library to store data.

As noted, the frame 102 provides a support for the other elements of the library. In addition, the frame may comprise one or more exterior surfaces that form a cabinet for enclosing most of the components of the library. Typically, the cabinet establishes an environment in which the temperature can be controlled for the benefit of the elements of the library housed within the cabinet. The cabinet also commonly serves as a barrier to contaminates that could adversely affect the operation of the elements of the library housed within the library. Additionally, the cabinet is also useful in preventing an individual from accessing the space within the cabinet during operation of the library and potentially being injured by the moving elements within the library.

The plurality of storage locations 104 comprises locations for holding at least one data storage element when it is not in communication with a data transfer interface 106. A data storage element may comprise any type of media on which data may be written to and/or read from via a data transfer interface 106 of the robotic data storage library 100. A data storage element, for example, may comprise a tape, a tape cartridge, a tape pack, a tape drive, a tape drive pack, a disk, a disk cartridge, a disk pack, a disk drive, a disk drive pack, a memory stick, a memory card, or any other data storage device that may be used to write data to and/or read data from via a data transfer interface 106. A storage location may be fixed or movable and be adapted to hold one or more data storage elements. For example, a storage location can comprise a support structure sized and shaped to hold a single data storage element or to hold a plurality of data storage elements.

The data transfer interface 106 receives a data storage element and establishes a communication path with the data storage element so that data can be transferred between the data storage element and a host computer. The data transfer interface 106, for example, may comprise a drive, such as a tape or disk drive for receiving a data storage element, or may comprise an interface port to which a data storage element, such as a tape or disk drive or drive pack, may be connected to establish a communication path with the storage medium of the data storage element.

The transport unit 108 comprises an assembly for moving a data storage element between one of the plurality of storage locations 104 and the data transfer interface 106. The transport unit 108, for example, may comprise a robot that may move a data storage element or may move a magazine or other group of data storage elements between one or more storage locations 104 and one or more data transfer interfaces 106.

The interface 110 for communicating with a host computer that uses the library to store data may comprise any type of interface known in the art. The interface 110, for example, may comprise a network port, a serial port, a universal serial bus port (USB), a parallel port, a data transfer bus or any other suitable interface.

There are a number of devices that do not necessarily need to be part of the robotic data storage library 100 (i.e., not supported by the frame) but are nonetheless needed for the library to function and, as a consequence, typically are part of the library. Among these devices are a power supply system 114 (which may be comprised of multiple power supplies) and a controller 116 for managing the operations of the library. If the robotic data storage library 100 is unable to passively dissipate enough heat for the elements of the library to function, environmental devices 118 (e.g., fan, fins, heat pipes etc.) can also be incorporated into the library.

In addition, there are several devices that typically are not required for the library 100 to function but are nonetheless desirable in certain embodiments. Among these devices are an entry/exit port 120 for moving a data storage element between an exterior environment that is accessible to an operator and a space that is accessible by the transport unit 108; a pass-through port 122 for moving data storage elements between robotic data storage libraries; and an operator interface 124 that allows an operator to interact with the library.

Soft power capability comprises controlling the application of power to components of the robotic data storage library 100 during a transition between an ON state and an OFF state. In a transition from an OFF state to an ON state, for example, a robotic data storage library can sequence the start up of power supplies and/or sequence the activation of library components to prevent large influxes of current. In a transition from an ON state to an OFF state, for example, a robotic data storage library can inform the components of an impending termination of power to enable the components to reach a quiescent state before the power supply to the components is terminated.

Figure 2:
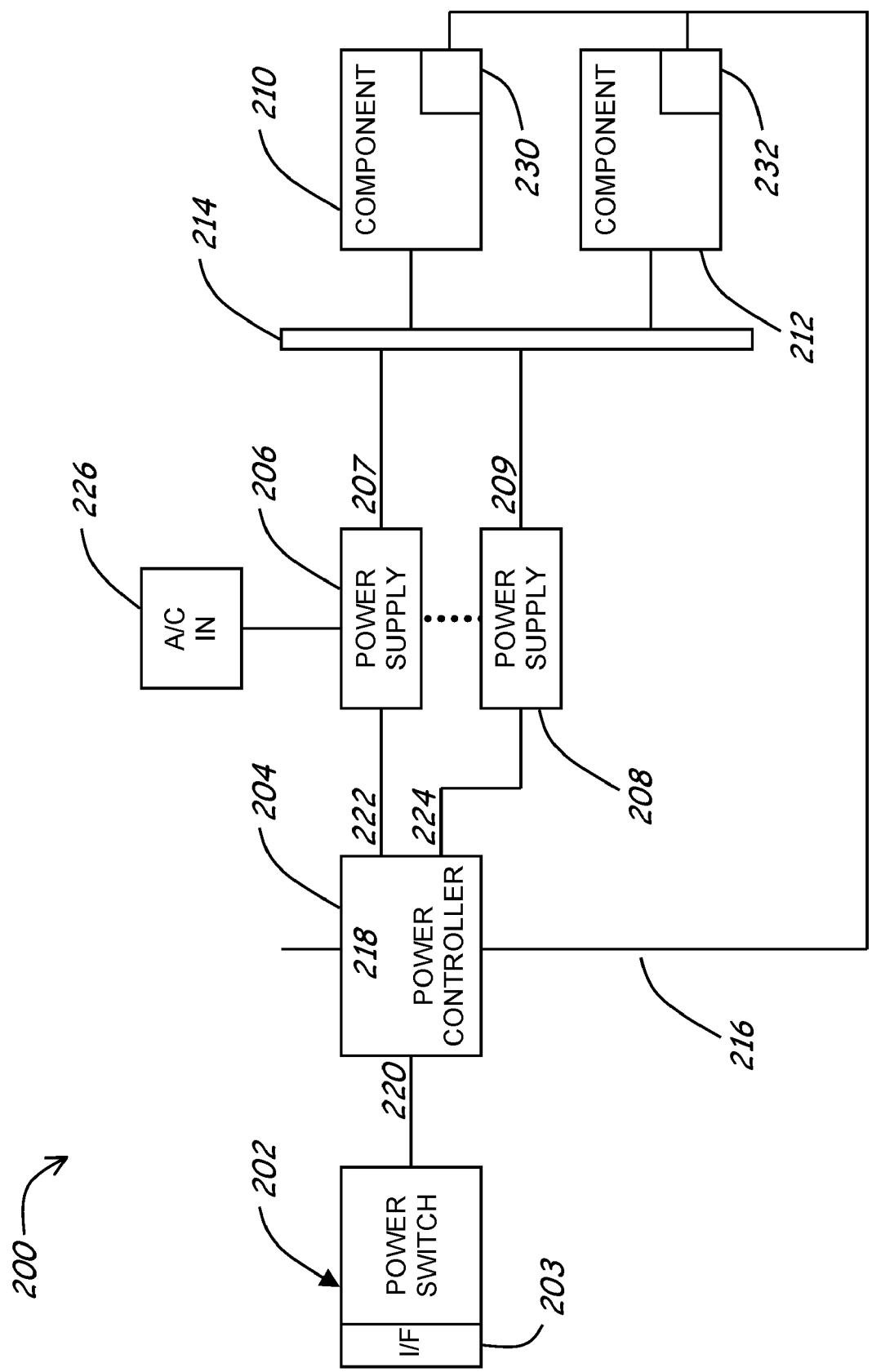
FIG. 2 shows a block diagram of one embodiment of a system for providing soft power capability for a robotic data storage library after a transition of a power switch between an ON state and an OFF state.

FIG. 2 shows a block diagram of one embodiment of a system 200 for providing soft power capability for a robotic data storage library 100. The system 200 as shown in FIG. 2 comprises: (a) a power switch 202 switchable between an ON state and an OFF state; (b) a power controller 204 for monitoring the power switch for a transition between the ON state and the OFF state and, in response, controlling the application of power to a component of the library; (c) a plurality of power supplies 206 and 208 for supplying power to a plurality of components 210 and 212 via bus 214; and (d) a communication network 216 for communicating between the power controller and the plurality of components 210 and 212.

The power switch 202 comprises an interface 203 for transitioning a state of the switch between an ON state and an OFF state. In one embodiment, the interface 203 may comprise a user interface, such as a switch capable of being switched by a user and monitored by a power controller. The interface 203, for example, may comprise a touch panel or an electromechanical switch on a panel of the robotic data storage library. An electromechanical switch, for example, may comprise a momentary switch or a latching switch. In another embodiment, the interface 203 may comprise a computer interface that may be capable of being switched by another device such as a host computer or a controller internal or external to the robotic data storage library 100. In yet another embodiment, the power switch 202 can comprise both a user interface and a computer interface.

The power controller 204 receives power via controller input 218 and monitors the state of the power switch 202 via controller input 220. In one embodiment, after a transition of the power switch 202 from an OFF state to an ON state, the power controller controls the outputs 207 and 209 of the power supplies 206 and 208, respectively, via controller outputs 222 and 224. In this particular embodiment, the power controller 204 sequences up the power supplies 206 and 208 via control lines 222 and 224, respectively. The power supplies 206 and 208, in turn, supply power to the bus 214, which provides power to the components 210 and 212. By sequencing up the power supplies 206 and 208, the power controller minimizes the collective influx of current drawn by the power supplies from the AC power input 226.

After the power controller 204 detects a transition from an ON state to an OFF state, the power controller 204, communicates with the components 210 and 212 via the network 216 to inform them of an impending shutdown. A component may comprise any element associated with a robotic data storage library that requires power to operate, whether internal or external to the library. In a cartridge-type data storage library, for example, a component may comprise a transport unit, a data transfer interface, such as a drive, a motor, a solenoid, a sensor, a relay, an environmental device, an entry/exit port, a passthrough port, a server, a host computer or any other element associated with the library requiring power for operation.

In the embodiment shown in FIG. 2, the components 210 and 212 each comprise a component controller 230 and 232, respectively. However, a single component controller may control a plurality of components. The component controllers 230 and 232 receive a message via the communications network 216 from the power controller informing the components 210 and 212 of an impending shutdown.

In one embodiment, the power controller 204 sends the message indicating that each of the component controllers 230 and 232 have a predetermined period of time before the power being provided by the power supplies to the components will be terminated. The component controllers 230 and 232 take steps necessary to place the components 210 and 212, respectively, in a quiescent state before the application of power to the components 210 and 212 is terminated. For example, a robot controller, can make sure that any move of a data storage element in process is completed, the robot is placed in a home position and/or any pending, uncompleted moves are set to a FAIL state so that the component controller and/or the host computer will know that these moves were not completed before the application of power to the robot was terminated. In another example, a component controller may save information currently stored in volatile memory into non-volatile memory so that it will be able to be retrieved upon power-up.

In another embodiment, the power controller 204 can send a message indicating that each of the component controllers 230 and 232 have a predetermined period of time before the supply of power to the components will be terminated unless one or more of the component controllers 230 and 232 respond before the expiration of the predetermined period and indicate that more time is necessary to place one or more components in a quiescent state. In this embodiment, for example, the component controllers can inform the power controller that an additional period of time is necessary to place their components in a quiescent state before the supply of power to the component is terminated. If the power controller 204 receives such a message from a component controller, such as 230, the power controller 204 extends the predetermined period of time before terminating the supply of power to the components 210 and 212. The power controller 204 can, for example, extend the original predetermined period of time by an additional predetermined extension period (e.g., 5 seconds) that is the same or different from the original predetermined period of time before terminating the supply of power to the components 210 and 212. Alternatively, the component controller may specify a period of time required for the component to be ready for the supply of power to be terminated.

In addition, the power controller can send an additional message prior to the expiration of the extension period informing the component controllers that the time before the supply of power to the components is terminated will be extended. At this point, the power controller may continue to loop until no component controllers have requested additional time before terminating the supply of power or may terminate the supply of power after the expiration of the extension period of time.

Other soft power functionalities may be performed as desired. For example, certain elements shown in FIG. 2, may only be required if soft power capability is desired for both transitions from an OFF state to an ON state and from an ON state to an OFF state. If soft power capability is only required for one of these transitions, however, these elements will not be required in such an embodiment of the present invention.

Figure 3:
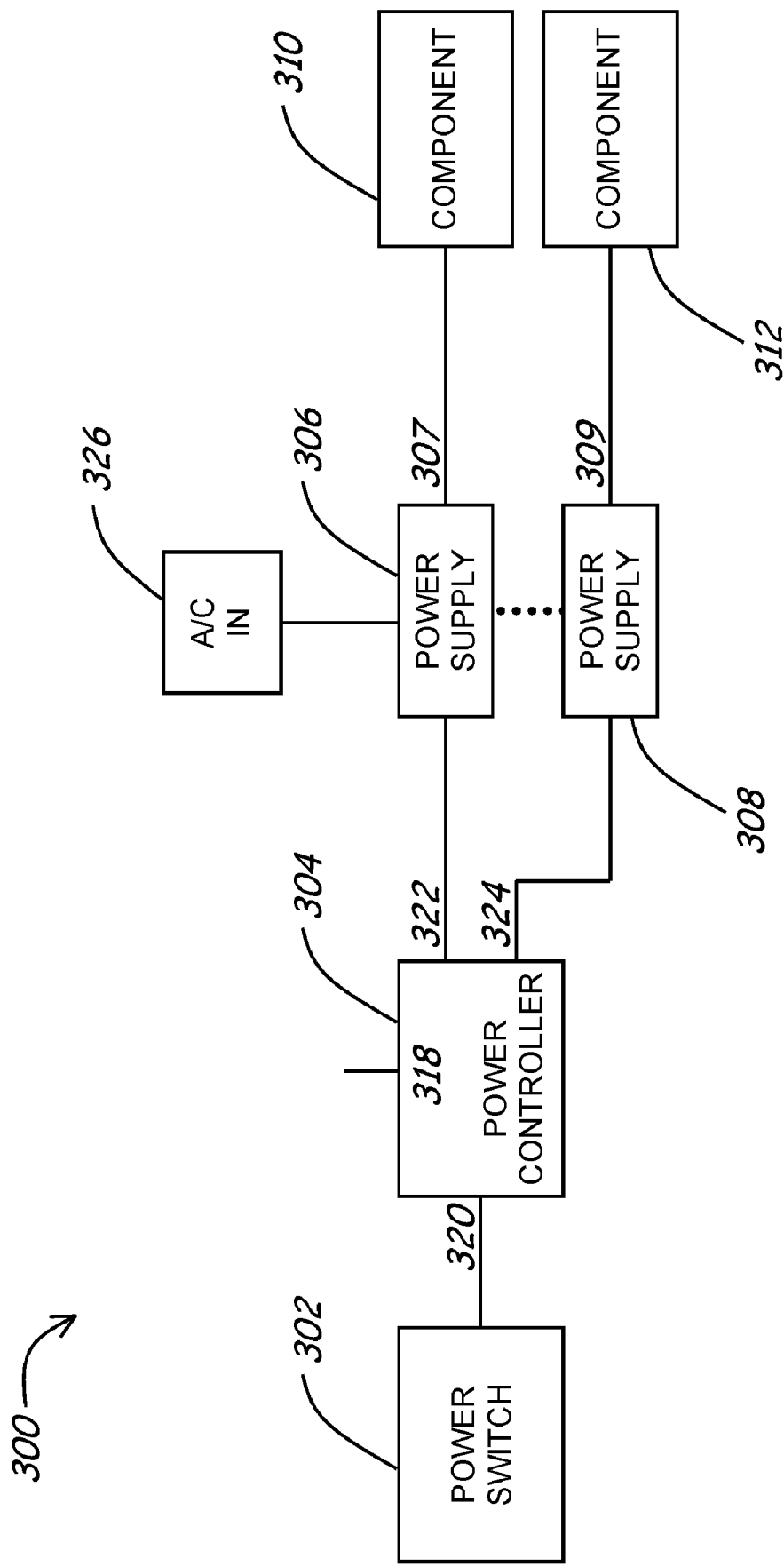
FIG. 3 shows a block diagram of an embodiment of a system for providing soft power capability for a robotic data storage library after a transition of a power switch from an OFF state to an ON state.

FIG. 3, for example, shows an alternative embodiment of the present invention that can provide soft power capability for a robotic data storage library 100 during a transition from an OFF state to an ON state. In the embodiment shown in FIG. 3, the system 300 comprises: (a) a power switch 302 switchable between an ON state and an OFF state; (b) a power controller 304 for monitoring the power switch for a transition between the ON state and the OFF state and, in response, controlling the application of power to a component of the library; and (c) a plurality of power supplies 306 and 308 for supplying power to a plurality of components 310 and 312. The communication network 216 of the embodiment shown in FIG. 2, however, is not necessary in this embodiment.

As described above with reference to FIG. 2, the power switch 302 can comprise any interface capable of transitioning a state of the switch between an ON state and an OFF state, and that can be monitored by the power controller 304. The power controller 304 receives power via controller input 318 and monitors the power switch 302 via controller input 320. After a transition of the power switch 302 from an OFF state to an ON state, the power controller controls the outputs 307 and 309 of the power supplies 306 and 308, respectively, via controller outputs 322 and 324. In this particular embodiment, the power controller 304 sequences up the power supplies 306 and 308 via control lines 322 and 324, respectively. The power supplies 306 and 308, in turn, sequence up one or more components 310 and 312 by directly providing power to the components upon power up. As described above, sequencing up the power supplies 306 and 308 minimizes the collective influx of current drawn by the power supplies from the AC power input 326.

Figure 4:
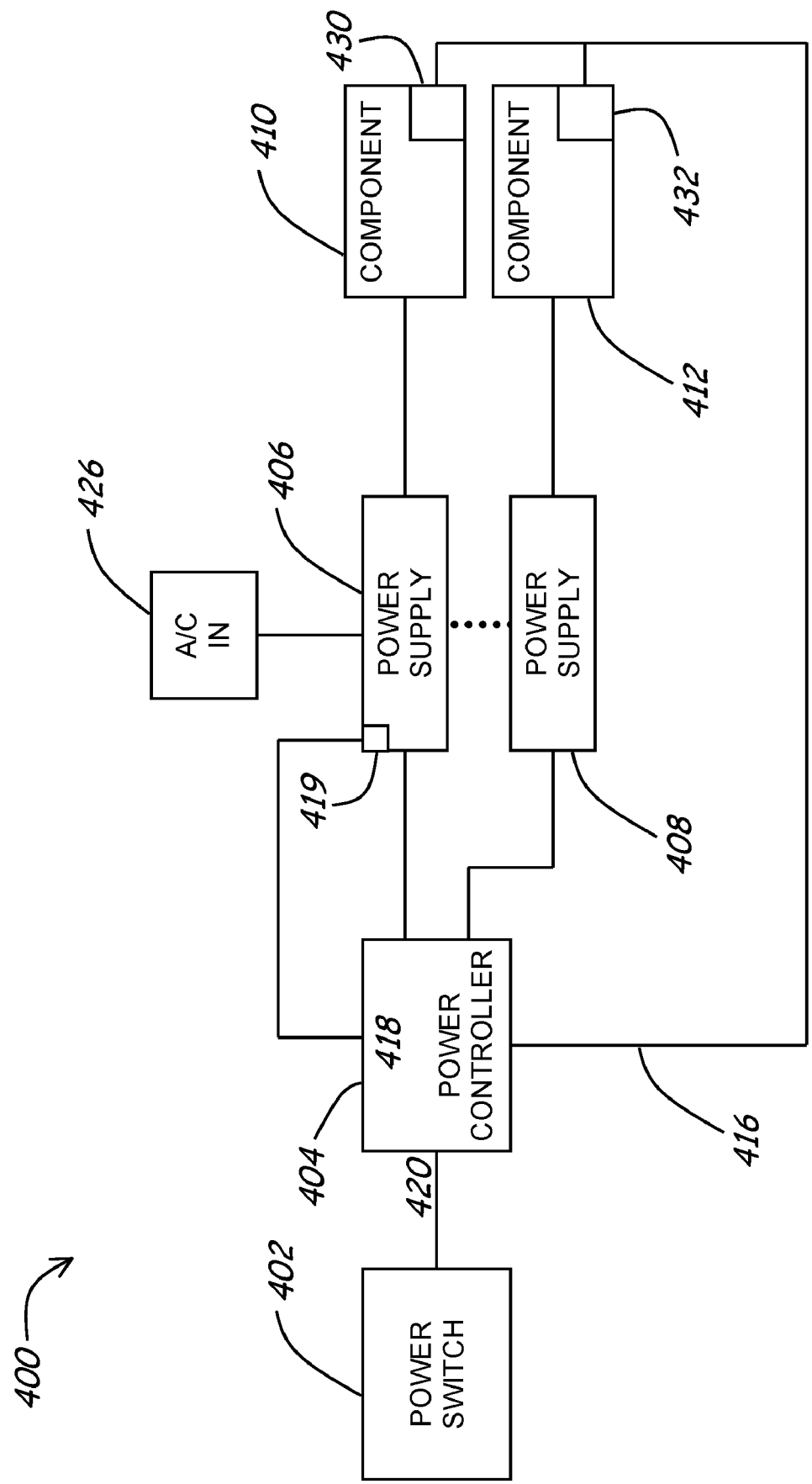
FIG. 4 shows a block diagram of a second embodiment of a system for providing soft power capability for a robotic data storage library after a transition of a power switch from an OFF state to an ON state.

FIG. 4 shows yet another embodiment of a system 400 for providing soft power capability for a robotic data storage library 100 for a transition from an OFF state to an ON state. As shown in FIG. 4, the system 400 comprises: (a) a power switch 402 switchable between an ON state and an OFF state; (b) a power controller 404 for monitoring the power switch for a transition between the ON state and the OFF state and, in response, controlling the application of power to a component of the library; (c) a plurality of power supplies 406 and 408 for supplying power to a plurality of components 410 and 412; and (d) a communication network 416 for communicating between the power controller 404 and the plurality of components 410 and 412.

Again, the power switch 402 can comprise any interface capable of transitioning a state of the switch between an ON state and an OFF state, and that can be monitored by the power controller 404. The power controller 404 receives power via a controller input 418 from a housekeeping voltage output 419 of the power supply 406 and monitors the power switch 402 via a controller input 420. Alternatively, the housekeeping voltage provided to the power controller 404 may be provided by any power supply or combination of power supplies in the library 100, or the library may comprise a power supply dedicated to providing power to the power controller 404. After a transition of the power switch 402 from an OFF state to an ON state, the power controller sequences up the components 410 and 412 by communicating with the component controllers 430 and 432, respectively (alternatively, the power controller may directly sequence up the components via the communications network 416 without the need for component controllers 430 and 432). In this embodiment, the power controller 404 sequences up the components 410 and 412 via the communications network 416. As described above, sequencing up the components 410 and 412 minimizes the collective influx of current drawn by the power supplies from the AC power input 426.

Figure 5:
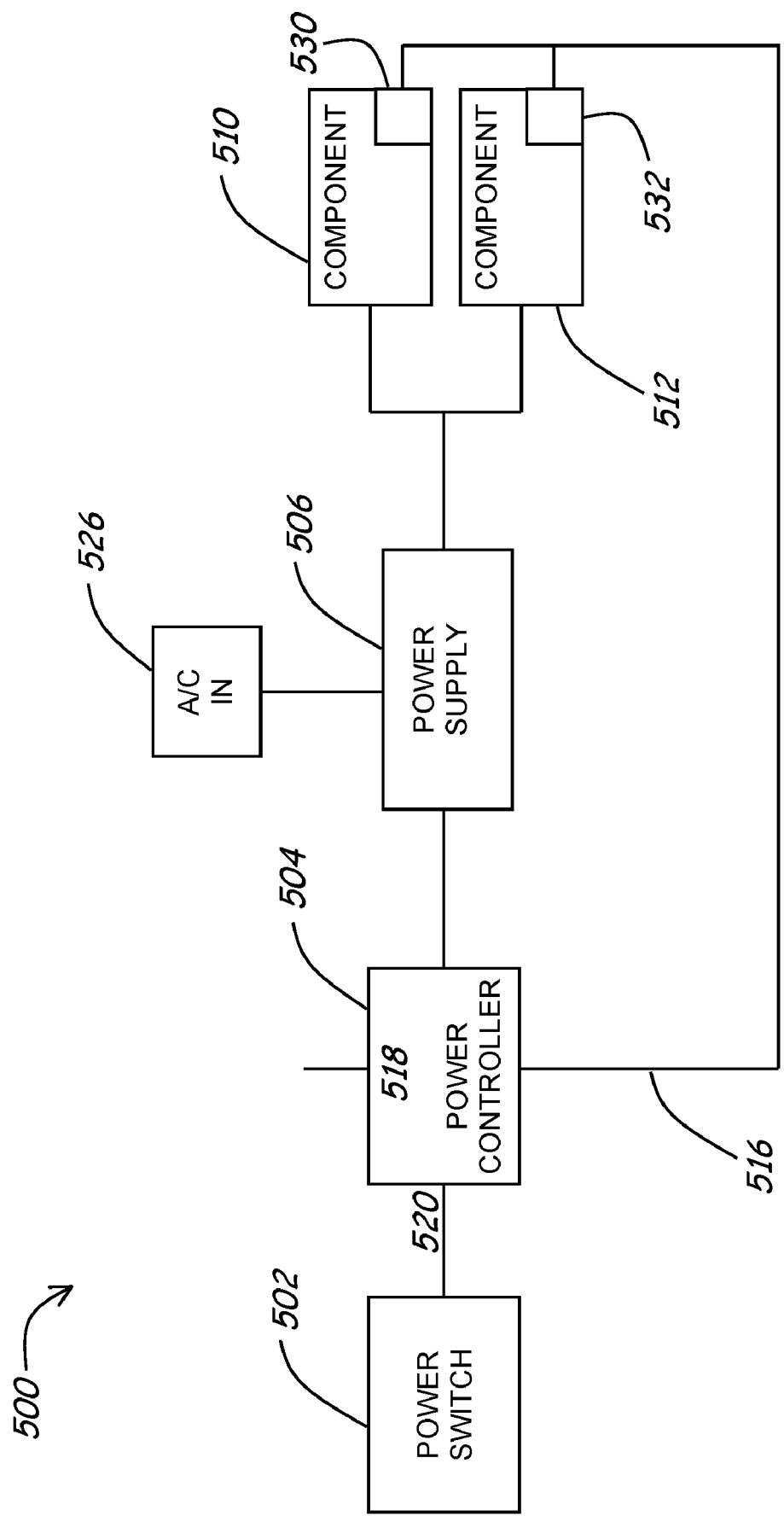
FIG. 5 shows a block diagram of an embodiment of a system for providing soft power capability for a robotic data storage library after a transition of a power switch from an ON state and an OFF state.

Soft power capability may also be provided during a transition from an ON state to an OFF state within the scope of the present invention without requiring soft power capability during a transition from an OFF state to an ON state. FIG. 5, for example, shows one embodiment of a system 500 that can provide soft power capability for a robotic data storage library 100 during a transition from an ON state to an OFF state. The system 500 comprises: (a) a power switch 502 switchable between an ON state and an OFF state; (b) a power controller 504 for monitoring the power switch for a transition between the ON state and the OFF state and, in response, controlling the application of power to a component of the library; (c) a power supply 506 for supplying power to a plurality of components 510 and 512; and (d) a communication network 516 for communicating between the power controller and the plurality of components 510 and 512.

The power switch 502 can comprise any interface capable of transitioning a state of the switch between an ON state and an OFF state and that can be monitored by the power controller 504. The power controller 504 receives power via controller input 518 and monitors the power switch 502 via controller input 520. After the power controller 504 detects a transition of the power switch 502 from an ON state to an OFF state, the power controller 504, communicates with the components 510 and 512 to inform them of an impending shutdown. In the embodiment shown in FIG. 5, the components 510 and 512 comprise a component controller 530 and 532, respectively. However, a single component controller can control a plurality of components. The component controller(s) receive a message from the power controller 504 informing the components 510 and 512 of an impending shutdown.

As described above, in one embodiment the power controller 504 can send a message over the communication network 516 indicating that each of the component controllers 530 and 532 have a predetermined period of time before the power supply to the components will be terminated. The component controllers 530 and 532 take steps necessary to place the components 510 and 512, respectively, in a quiescent state before the application of power to the components 510 and 512 is terminated. For example, a robot controller, can make sure that any move of a data storage element in process is completed, the robot is placed in a home position and any pending, uncompleted moves are set to a FAIL state so that the component controller and/or the host computer will know that these moves were not completed before the application of power to the robot was terminated. In another example, a component controller may save information currently stored in volatile memory into non-volatile memory so that it will be able to be retrieved upon power-up.

In another embodiment, the power controller 504 can send a message indicating that each of the component controllers 530 and 532 have a predetermined period of time before the supply of power to the components will be terminated unless one or more of the component controllers 530 and 532 respond before the expiration of the predetermined period and indicate that more time is necessary to place one or more components in a quiescent state. In this embodiment, for example, the component controllers can inform the power controller that an additional period of time is necessary to place their components in a quiescent state before the supply of power to the component is terminated. If the power controller 504 receives such a message from a component controller, such as 530, the power controller 504 extends the predetermined period of time before terminating the supply of power to the components 510 and 512. The power controller 504 can, for example, extend the original predetermined period of time by an additional predetermined extension period (e.g., 5 seconds) that is the same or different from the original predetermined period of time before terminating the supply of power to the components 510 and 512. Alternatively, the component controller may specify a period of time required for the component to be ready for the supply of power to be terminated.

In addition, the power controller can send an additional message prior to the expiration of the extension period informing the component controllers that the time before the supply of power to the components is terminated will be extended. At this point, the power controller may continue to loop until no component controllers have requested additional time before terminating the supply of power or may terminate the supply of power after the expiration of the extension period of time.

Figure 6:
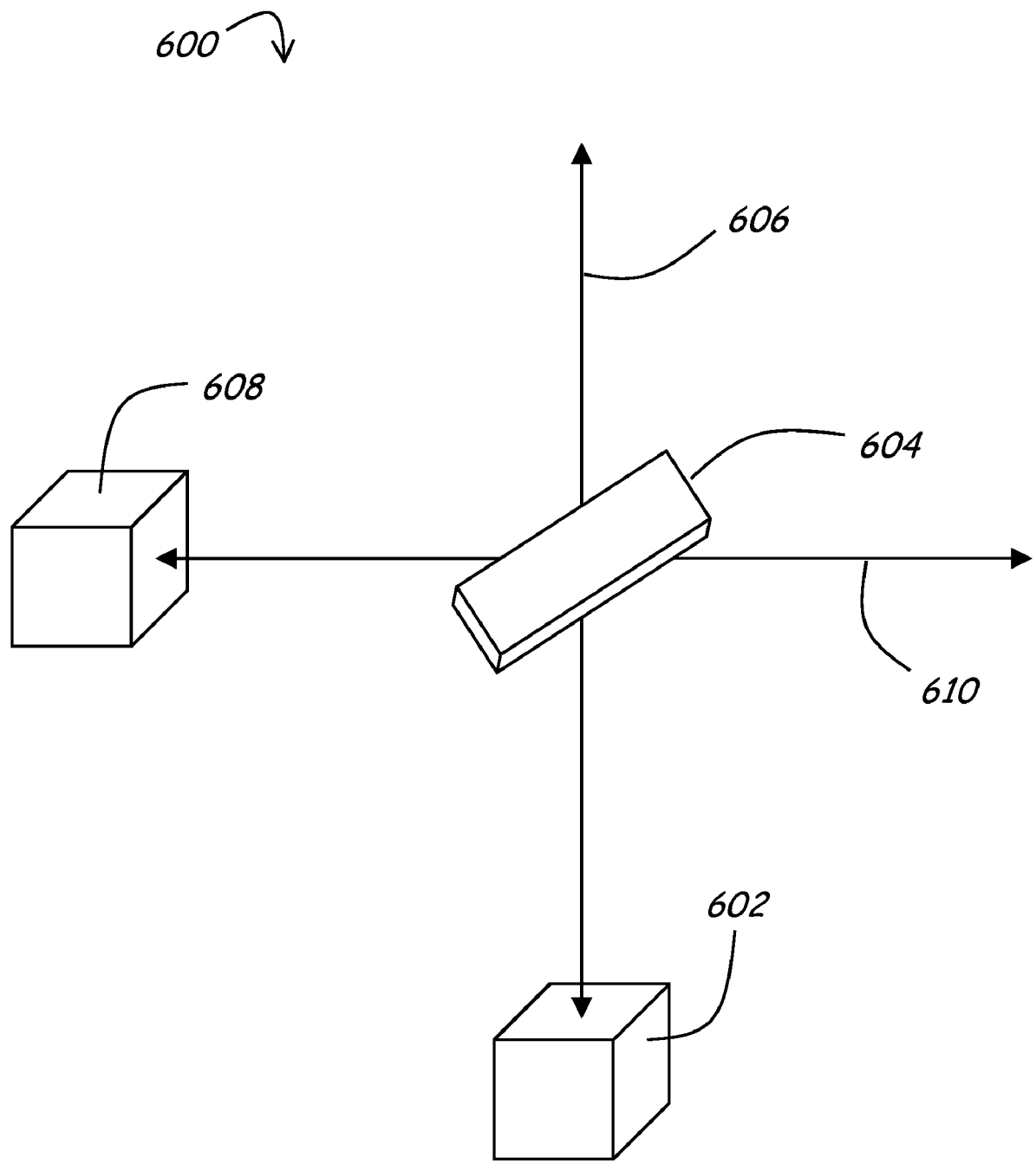
FIGS. 6 through 8 show system diagrams of axes of motion of a transport unit of a magazine-based cartridge data library.
Figure 8:
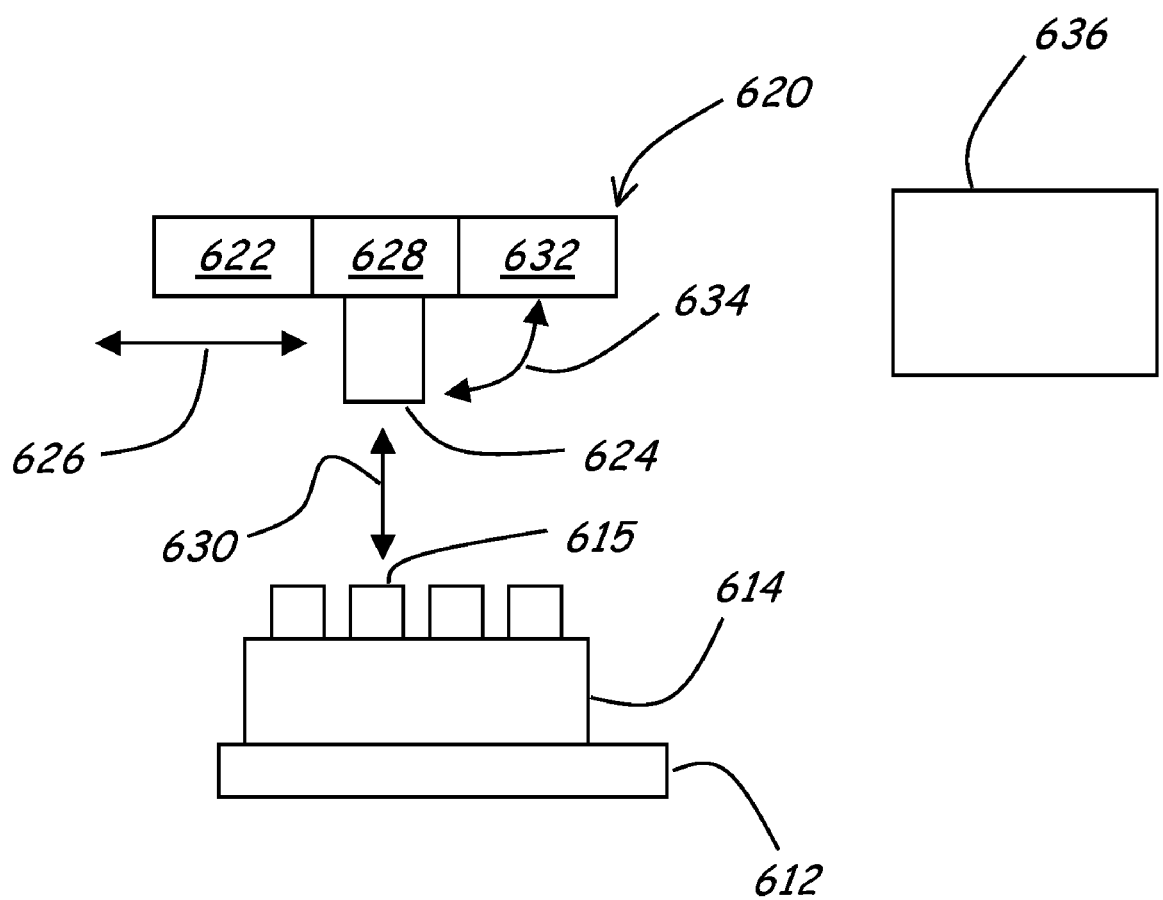

In one embodiment, for example, a robotic data storage library can comprise a magazine-based data cartridge library. In a magazine-based data cartridge library, individual cartridges are stored in magazines. The magazine and/or individual cartridges are moved within the library. In one embodiment of a magazine-based data cartridge library, for example, a transport unit can move magazines and/or cartridges. As shown in FIGS. 6 8, for example, a transport unit in a magazine-based cartridge library can have a plurality of axes of motion for transporting magazines and/or cartridges with the library. In FIG. 6, for example, the transport unit 600 may comprise a first assembly 602 for moving a magazine transport and cartridge picker assembly 604 along a vertical axis 606 and a second assembly 608 for moving the magazine transport and cartridge picker assembly 604 along a horizontal axis 610. The assemblies 602 and 608, for example, may comprise motors, solenoids and/or any other assembly known in the art.

Figure 7:
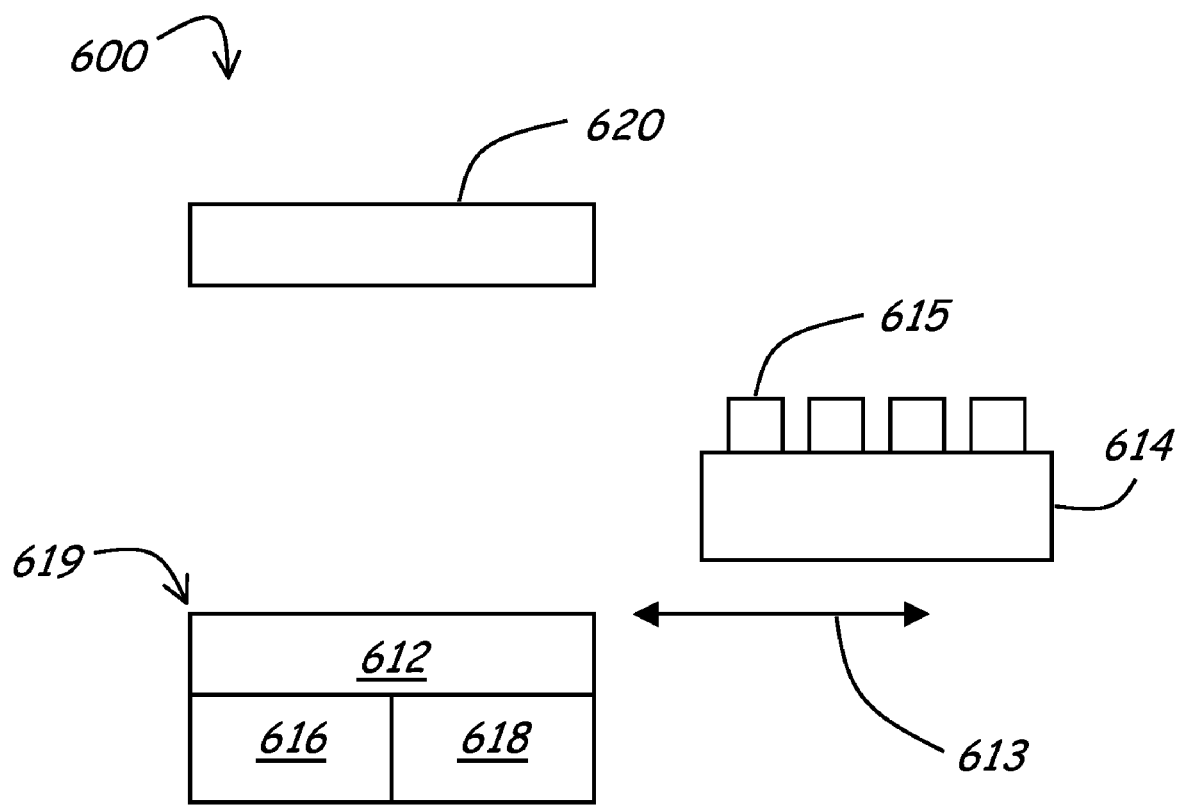

FIG. 7 shows a block diagram of additional possible axes of motion for a transport unit 600 that may be used in a magazine-based data cartridge library. In this embodiment, the transport unit 600 comprises a magazine transport 619 and a cartridge picker assembly 620. The magazine transport 619 comprises a platform 612 for supporting a magazine 614 that has been removed from a magazine storage location, an extension assembly 616 for extending into and retracting out of magazine storage locations along a magazine axis 613, and an engaging assembly 618 for engaging and/or releasing a magazine 614. The cartridge picker assembly 620 engages and/or releases one or more individual cartridges 615. The assembly 616, for example, can extend and retract along the magazine axis 613 perpendicular to the vertical axis 606 and the horizontal axis 610 when the cartridge transport is moved to a position outside a storage location of the library.

The assembly 616, for example, may comprise motors, solenoids and/or any other assembly known in the art. The engaging assembly 618 engages a magazine and/or releases a magazine from the magazine transport 619. The engaging assembly 618, can move along a linear or rotational engaging axis, for example, and may comprise any assembly for grabbing, hooking, locking, or otherwise engaging a magazine known in the art.

FIG. 8 shows another set of axes that may be used in a transport unit of a magazine-based data cartridge library. As shown in FIG. 8, for example, the cartridge picker assembly 620 may comprise a picker element alignment assembly 622 for moving a picker element 624 along a cartridge axis 626 parallel to a length of a magazine 614 to align the picker element 624 with a cartridge 615 in the magazine 614, a picker element extension assembly 628 for extending a picker element 624 into and/or retracting the picker element 624 out of a magazine 614 along a picker axis 630, and a picker element rotation assembly 632 for rotating the picker element 624 along a rotational axis 634 to orient a cartridge 615 for insertion into a drive 636 or other data transfer interface. The assemblies 622, 628 and 632, for example, may comprise motors, solenoids and/or any other assembly known in the art.

Figure 9:
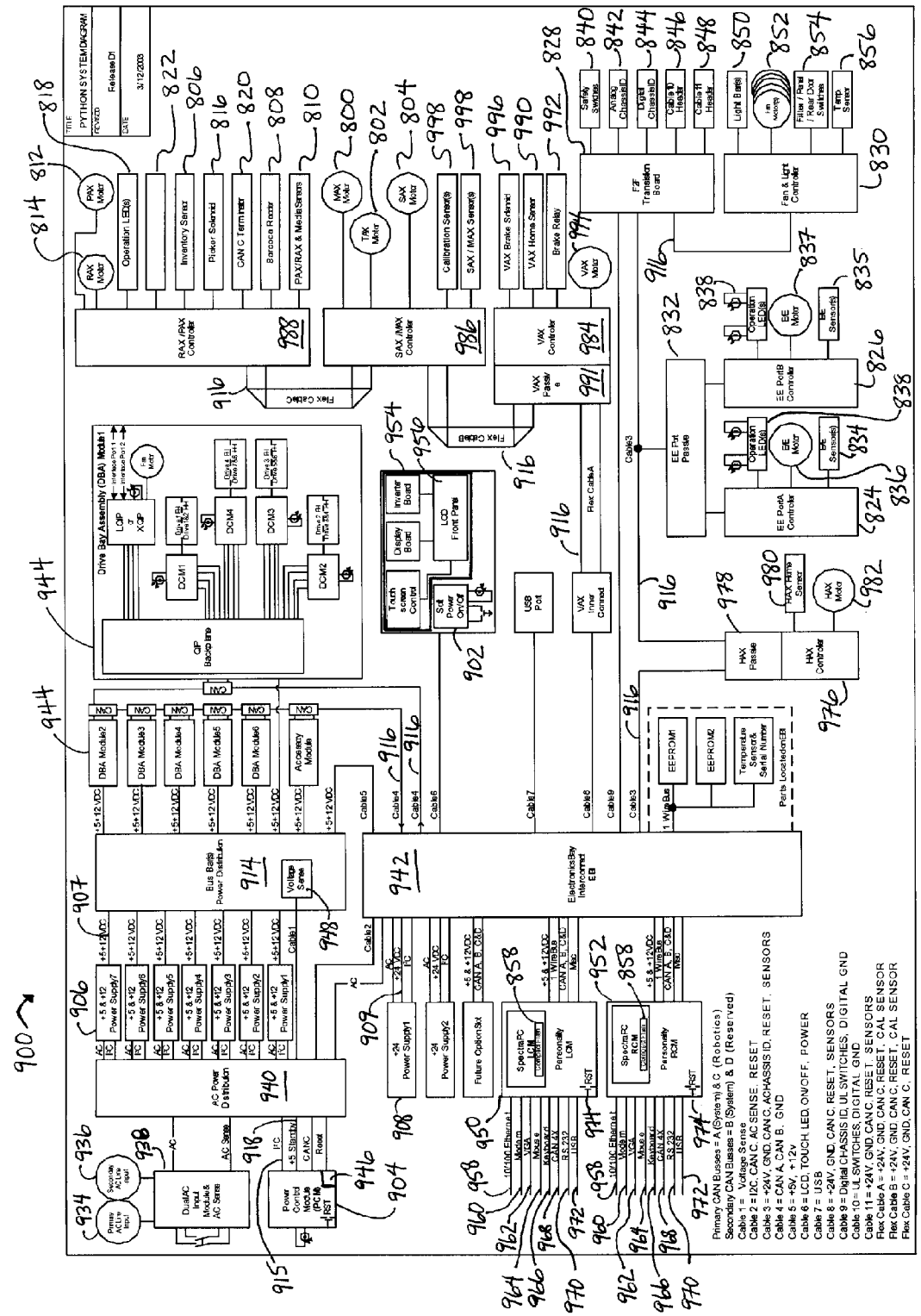
FIG. 9 shows a block diagram of a second embodiment of a system for providing soft power capability for a robotic data storage library after a transition of a power switch between an ON state and an OFF state.

FIG. 9 shows a block diagram of one embodiment of a magazine-based data cartridge library 900 comprising soft power capability. The library 900 receives power from a primary AC power input 934 and a secondary AC power input 936. In one exemplary embodiment, the secondary AC power input 936 comprises an uninterruptible power supply (UPS) to seamlessly provide power to the system in the event of a power failure of the primary AC power input. The primary and secondary AC power inputs 934 and 936 are connected to an AC input module 938, which provides a breaker system for switching between the two power inputs and/or disconnecting the incoming AC power to the library 900. From the AC input module 938, AC power is fed to an AC power distribution panel 940. From the AC power distribution panel 940, the AC power is fed to a plurality of +5/12 volt power supplies 906 and to a plurality of +24 volt power supplies 908 (via an electronics bay interconnect panel 942). While the DC power supplies shown in FIG. 9 comprise +5/12 volt and +24 volt power supplies, the voltage levels of these DC power supplies is merely exemplary. As one skilled in the art would appreciate, other voltage levels are possible.

The +5/12 volt power supplies 906, in turn, provide power to a bus bar power distribution panel 914 for distribution to components of the library 900. The bus bar power distribution panel 914 supplies power to one or more data transfer interfaces and to the electronic bay interconnect (EBI) 942 via cable 5. The EBI 942 also receives power from the +24 volt power supplies 908 and distributes +5 volts, +12 volts and +24 volts to other components of the library 900.

The +5/12 volt power supplies 906 also provide a housekeeping voltage 918 for powering a power control module 904. The power control module 904 is also connected to the +5/12 and 24 volt power supplies 906 and 908 via a communications network 915, which in exemplary embodiments can be implemented using an Inter IC (IIC) network provided by Phillips, a Control Area Network (CAN) or other type of network or communications link. In one embodiment, the power control module 904 comprises non-volatile memory 946 to store a boot-strap program for maintaining persistence through AC power cycles. In another embodiment, the power control module 904 monitors the output voltage of the +5/12 volt power supplies 906 and/or the +24 volt power supplies 908, such as via a voltage sense module 948. In this embodiment, the power control module 904 signals one or more power supplies 906 and/or 908 via the communications network 915 if their output voltage strays from the desired voltage or can increase current provided by one or more power supplies 906 and/or 908 if one or more power supplies has failed.

The EBI 942 also provides power to a library control module (LCM) 950 and a robot control module (RCM) 952. The LCM 950 comprises a controller for controlling an operator interface 954. The operator interface 954, for example, can comprise an interface such as an LCD touch screen panel 956 located on a frame of the library 600. In one embodiment, for example, the LCM 950 can communicate with an operator, such as by posting messages and/or submitting queries, and receiving commands and/or responding to queries. In the particular embodiment shown in FIG. 9, for example, the LCM 950 can also comprise an Ethernet port 958, a modem 960, a VGA port 962, a mouse port 964, a keyboard port 966, a CAN port 968, an RS232 port 970, a universal serial bus port 972, a serial port 974 and/or any other means of communicating to external device(s) (such as a host computer) and/or external network(s). An operator, for example, may communicate with the library via a browser over a network interface.

The RCM 952 comprises a controller for controlling the operation of a robotic transport unit. As described above with reference to FIGS. 6 8, this embodiment of a magazine-based data cartridge 900 comprises a transport unit comprising seven axes of motion: (a) a vertical axis 606, (b) a horizontal axis 610, (c) a magazine axis 613, (d) an engaging axis, (e) a cartridge axis 626, (f) a picker axis 630, and (g) a picker element rotational axis 634. In the particular embodiment shown in FIG. 9, the RCM 952 communicates with four sub-controllers that directly control the motion of the transport unit over the seven axes of motion via a communications network 916. The communications network 916, in one embodiment, may comprise a Control Area Network (CAN) such as shown in FIG. 9 that is independent of the communication network 915 used by the power control module 904 to communicate with the power supplies 906 and 908. (Although the communications network 916 is linked with the communication network 915 via the power controller, which is connected to both networks 915 and 916.) Alternatively, a single communications network or two completely distinct networks may be implemented to perform the functions. In the particular embodiment shown in FIG. 9, for example, the RCM can also comprise an Ethernet port 958, a modem 960, a VGA port 962, a mouse port 964, a keyboard port 966, a CAN port 968, an RS232 port 970, a universal serial bus port 972, a serial port 974 and/or any other means of communicating to external device(s) (such as a host computer) and/or external network(s).

The horizontal axis controller 976 is linked to the EBI 942, and thus to the RCM 952, via cable 3, which comprises a power supply, a network connection (CAN 916) and other communications links, via the horizontal axis passive interconnect 978. The horizontal axis controller 976 receives an input from a transport unit horizontal axis home sensor 980 and controls a transport unit horizontal axis motor 982.

The remaining transport unit subcontrollers: a vertical axis controller 984, a magazine transport platform controller 986, a cartridge picker assembly controller 988 are linked to the EBI 942 and RCM 952 via cable 9 and flex cables A, B and C, which also comprise power supply, network connection (CAN) and other communications links via their sub-controller passive interconnect 991. The vertical axis controller 984, for example, receives an input from a vertical axis home sensor 990 and a brake relay 992 and controls a vertical axis motor 994 and a vertical axis brake solenoid 996, which provides a braking mechanism to restrict the motion of the transport unit along the vertical axis 606. The magazine transport platform controller 986 also comprises inputs from sensor(s) 998 for the magazine axis 613, the engaging axis and the cartridge axis 626 and controls the operation of the transport unit along these axes via the magazine motor 800, the engaging motor 802 and the cartridge motor 804. The cartridge picker assembly controller 988 comprises inputs from an inventory sensor 806, a barcode reader 808, and picker axis and picker element rotational axis sensor(s) 810. The cartridge picker assembly controller 988 controls the operation of the transport unit along the picker axis 630 and the picker element rotational axis 634 via the picker element motor 812 and the picker element rotational motor 814. The cartridge picker assembly controller 988 can also control a picker solenoid 816 for releasing a cartridge from the cartridge picker assembly if desired. The cartridge picker assembly controller 988 can also control operation LED(s) 818 for indicating one or more statuses related to the transport unit and comprises a CAN terminator 820. The cartridge picker assembly controller 988 may also communicate via wireless communication, such as using a Bluetooth protocol, via a wireless communication port 822. For example, a data storage element or other component of the library may comprise a wireless transmitter for identifying itself to a wireless receiver of the cartridge picker assembly.

Cable 3, which as described above links the horizontal axis controller 976 to the EBI, further links a pair of entry/exit port controllers 824 and 826, a frame-to-frame transition board 828 and a fan and light controller 830 to the EBI 942. The entry/exit port controllers 824 and 826 comprise an entry/exit port passive interconnect 832 for connecting to cable 3. The entry/exit port controllers 824 and 826 also comprise inputs from sensor(s) 834 and 835 and control the operation of entry/exit port motors 836 and 837. The entry/exit port controllers 824 and 826 can also control operation LED(s) 838 for indicating one or more statuses related to the entry/exit port. The frame-to-frame transition board 828 provides a communication port for communicating with one or more other chassis and provides safety switches 840, analog and digital chassis IDs 842 and 844, and a pair of cable headers 846 and 848 for connecting to one or more other chassis. The fan and light controller 830 further controls the operation of one or more lights 850, fan motors 852 and switches 854 of the library and monitors one or more temperature sensors 856 for the library.

Cable 6 further links the EBI 942 to the front panel, which in this particular embodiment comprises an LCD touch screen front panel 956 and a power switch 902. In one embodiment, for example, the power switch 902 may comprise a momentary switch. In this embodiment, the power control module 904 monitors the power switch 902 for a transition between an ON state and an OFF state. For example, as the momentary switch is transitioned from one state to another state (e.g., by pressing the momentary switch), the power control module 904 monitors the switch for the transition.

Cable 4 also links the drive bay assembly modules 944 to the CAN. One of the drive bay assembly modules 944 is shown in detail in FIG. 9. The drive bay assembly module 944 comprises: four drives, four drive control modules, a quad interface backplane, and a quad interface processor. Although the drive bay assembly module 944 is shown comprising four drives and four drive control modules, any number of drives and drive control modules are possible. The quad interface processor is connected to the CAN and power supplies via the quad interface backplane and cable 4. The quad interface processor is also connected to the drive control modules, which control each of the drives. The quad interface processor comprises a pair of interface ports for connecting to an external device (such as a host computer) and/or a network. In another embodiment, it is also possible for the quad interface backplane to comprise one or more interfaces for connecting to an external device and/or network. The quad interface processor also monitors a temperature sensor and controls one or more fans or other cooling devices to keep the drive bay assembly operating within a desired temperature range.

During operation, the power control module 904 monitors the power switch 902 for a transition between an ON state and an OFF state. After detecting a transition, the power control module 904 controls the application of power to the components of the library to provide soft power capability. As described above, an interface of the power switch can be implemented by the power switch 902 being activated by a user interface and/or by a computer interface, such as by the power control module 904 receiving a message from an external device (such as a host computer or an uninterruptible power supply) via the communication network 916 from an external connection (e.g., an Ethernet port 958 of the LCM 950 or the RCM 952). In one embodiment, for example, the power controller 904 may comprise an interface port for directly connecting with an external device (such as a host computer or an uninterruptible power supply) and/or an external network.

In one embodiment, for example, after a transition of the power switch 902 from an OFF state to an ON state, the power control module 904 controls the outputs 907 and 909 of the power supplies 906 and 908, respectively, via the power communications network 915. In this particular embodiment, the power control module 904 sequences up the power supplies 906 and/or 908 via the power communications network 915. The power supplies 906 and 908, in turn, supply power to the bus bar power distribution panel 914 and the electronics bay interconnect (EBI) 942, which provide power to the components of the library 900. By sequencing up the power supplies 906 and/or 908, the power control module 904 minimizes the collective influx of current drawn by the power supplies 906 and 908 from the AC power input(s) 934 and/or 936.

After the power control module 904 detects a transition from an ON state to an OFF state, whether via the a user interface or a computer interface of the power switch 902, the power control module 904, sends a message over the communications network 916 notifying the components of an impending shutdown. A component of the library 900, for example, may comprise an element of the library 900 that requires power to operate, such as the transport unit motors, the drives, the entry/exit port, the fan, the light, the LCM and the RCM.

In the embodiment shown in FIG. 9, components such as the transport unit motors and solenoids, the drives, the entry/exit port motors, the fan motor(s) and the light(s) comprise controllers are connected to the communications network 916. The controller(s) receive a message via the communications network 916 from the power control module informing the components of an impending shut-down.

In one embodiment, the power control module 904 sends the message indicating that each of the component controllers have a predetermined period of time before the power supply to the components will be terminated. The component controllers take steps necessary to place the components in a quiescent state before the application of power to the components is terminated. For example, the RCM 952 and/or the transport unit sub-controllers 976, 984, 986 and 988 can make sure that any move of a magazine and/or cartridge in process is completed, the transport unit is placed in a home position and any pending, uncompleted moves are set to a FAIL state so that the RCM 952 and/or a host computer will know that these moves were not completed before the application of power to the transport unit was terminated. In another example, a controller such as the LCM 950 and/or the RCM 952 may save information currently stored in volatile memory into non-volatile memory 858 so that it will be able to be retrieved upon power-up.

In another embodiment, the power control module 904 can send a message indicating that each of the component controllers have a predetermined period of time before the supply of power to the components will be terminated unless one or more of the component controllers respond before the expiration of the predetermined period and indicate that more time is necessary to place one or more components in a quiescent state. In this embodiment, for example, the component controllers can inform the power control module 904 that an additional period of time is necessary to place their components in a quiescent state before the supply of power to the component is terminated. If the power control module 904 receives such a message from a component controller, such as the RCM 952, the power control module 904 extends the predetermined period of time before terminating the supply of power to the components. The power control module 904 can, for example, extend the original predetermined period of time by an additional predetermined extension period (e.g., 5 seconds) that is the same or different from the original predetermined period of time before terminating the supply of power to the components. Alternatively, the component controller may specify a period of time required for the component to be ready for the supply of power to be terminated.

In addition, the power control module 904 can send an additional message prior to the expiration of the extension period informing the component controllers that the time before the supply of power to the components is terminated will be extended. At this point, the power control module 904 may continue to loop until no component controllers have requested additional time before terminating the supply of power or may terminate the supply of power after the expiration of the extension period of time.

In another embodiment, the power control module 904 of the robotic data storage library 900 may be configured to power up or power down the library 900 after a period of time has elapsed. In one embodiment, for example, the power control module 904 of the robotic data storage library 900 may be configured to power up the library 900 after a period of time has elapsed since the library 900 has powered down. In another embodiment, the power control module 904 of the robotic data storage library 900 may be configured to power down the library 900 after a period of time has elapsed since the library 900 has powered on. The power control module 904, for example, may wait a period of time after the application of power was terminated to the component to power on the library. Alternatively, the power control module 904 may wait a period of time after the application of power was applied to the component before terminating the application of power to the component. The period of time may be a fixed, predetermined period of time or may be configurable by an operator. In addition, the power control module 904 may receive a remote command from an operator to initiate a transition between an ON state and an OFF state. The power control module 904, for example, may be accessed remotely, such as via a browser over a network interface, and the power switch can be transitioned between an ON state and an OFF state remotely.

Figure 10:
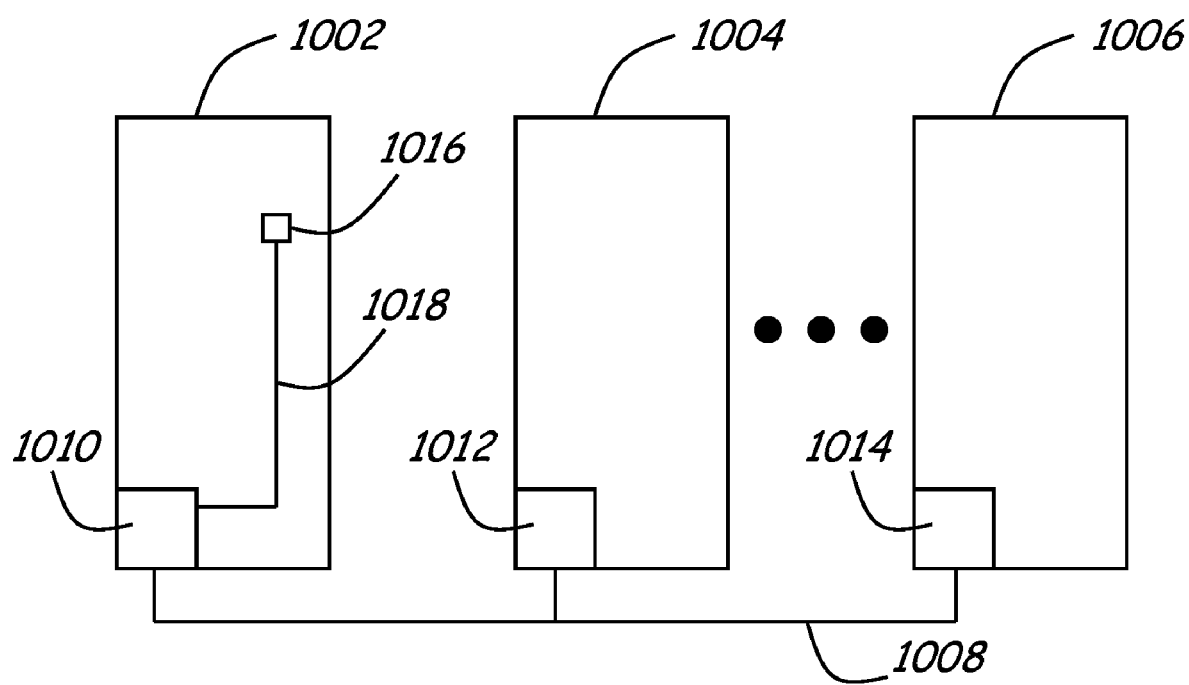
FIG. 10 shows a block diagram of an embodiment of a system for providing soft power capability in a robotic data storage library comprising a plurality of chassis linked together.

FIG. 10 shows a plurality of robotic data storage library chassis 1002, 1004 and 1006 linked together by a communication network 1008. Each of the library chassis 1002, 1004 and 1006 comprises a power controller 1010, 1012 and 1014, respectively, linked by the communications network 1008. In one embodiment, the power controller 1010 comprises a master power controller and the power controllers 1012 and 1014 comprise slave power controllers. The library chassis 1002 can also comprise a power switch 1016, which is monitored by the master power controller 1010. The power switch 1016, however, need not be physically attached to the library chassis 1002 or even any of the library chassis. In addition, as discussed above a switch interface of the power switch may comprise a user interface and/or a device interface.

As described above, the master power controller 1010 monitors the power switch 1016. In one embodiment, after a transition of the power switch 1016 from an OFF state to an ON state, the power controller performs as described below by sequencing up power controllers and/or components of the library chassis 1002. In addition, however, the master power controller 1010 also sends a message via the network 1008 to the slave power controllers 1012 and 1014. After receiving the message from the master power controller 1010, each of the slave controllers sequence up the power supplies and/or components of their respective chassis.

After the master power controller 101 detects a transition from an ON state to an OFF state, the power controller 1010 communicates with the components of the chassis 1002 to inform them of an impending shutdown. In one embodiment, the message sent by the master power controller 1010 is also received by the slave power controllers 1012 and 1014 via network 1008. In another embodiment, the master power controller 1010 sends a separate message to the slave power controllers 1012 and 1014 via the network 1008. When the slave power controllers 1012 and 1014 receive the message from the master power controller 1010, the slave power controllers 1012 and 1014 communicate with the components of their respective chassis to inform them of an impending shutdown as described above. In one embodiment, the slave power controllers 1012 and 1014 can request additional time by sending a message to the master power controller 1010 in the same manner as the component controllers described above.

While the invention has been particularly shown and described with reference to a preferred embodiment thereof, it will be understood by those skilled in the art that various other changes in the form and details may be made without departing from the spirit and scope of the invention.

The invention claimed is:

1. A robotic data storage library with soft power capability, the library comprising: a plurality of storage locations, each capable of holding at least one data storage element; a data transfer interface for receiving said data storage element and establishing a communication path with said data storage element so that data can be transferred between the data storage element and a host computer; a transport unit for moving said data storage element between one of said plurality of storage locations and said data transfer interface; a power supply for providing power to a component of the library; a power switch switchable between an ON state and an OFF state; and a power controller for monitoring said power switch for a transition between said ON state and said OFF state and after detecting said transition of said power switch between said ON state and said OFF state, controlling power applied to said component.

2. The library, as claimed in claim 1, wherein: said power controller comprises means for terminating the application of power to said component after a fixed amount of time has expired since detecting said transition of said power switch from said ON state to said OFF state.

3. The library, as claimed in claim 1, wherein: said power controller comprises means for terminating the application of power to said component after a variable amount of time has expired since detecting said transition of said power switch from said ON state to said OFF state.

4. The library, as claimed in claim 1, wherein: said power controller comprises means for sequencing a power output of said power supply with a second power output of a second power supply.

5. The library, as claimed in claim 1, wherein: said power supply comprises a power input interface for receiving power from a power source and a power output interface for providing power to components of the library.

6. The library, as claimed in claim 1, wherein: said power switch comprises a user interface that allows an individual to transition said power switch between said ON state and said OFF state.

7. The library, as claimed in claim 1, wherein: said power switch comprises an interface that allows an external device to transition said power switch between said ON state and said OFF state.

8. The library, as claimed in claim 7, wherein: said interface comprises a host computer interface that allows a said host computer to transition said power switch between said ON state and said OFF state.

9. The library, as claimed in claim 7, wherein: said interface comprises an uninterruptible power supply interface that allows an uninterruptible power supply to transition said power switch from said ON state to said OFF state.

10. The library, as claimed in claim 1, wherein: said component is said transport unit.

11. A robotic data storage library with soft power capability, the library comprising: a plurality of storage locations, each capable of holding at least one data storage element; a data transfer interface for receiving a data storage element and establishing a communication path with said data storage element so that data can be transferred between the data storage element and a host computer; a transport unit for moving said data storage element between one of said plurality of storage locations and said data transfer interface; a power supply for providing power to a component of the library; a power switch switchable between an ON state and an OFF state; a power controller for monitoring said power switch for a transition from said OFF state to said ON state and, after detecting said transition of said power switch from said OFF state to said ON state, delaying power applied to said component for a period of time after detection of said transition of said power switch from said OFF state to said ON state.

12. The library, as claimed in claim 11, wherein: said power supply comprises a first power supply comprising a first power output for providing power to said component of the library and a second power supply comprising a second power output for providing power to a second component of the library.

13. The library, as claimed in claim 12, wherein: said power controller is adapted to sequentially enable said first power output of said power supply and said second power output of said second power supply to provide power to said component and said second component after detecting said transition of said power switch from said OFF state to said ON state.

14. The library, as claimed in claim 13, wherein: said first power output of said first power supply and said second power output of said second power supply are electrically connected to a common bus for providing power to said component and said second component.

15. The library, as claimed in claim 11, wherein said component is not associated with a second power supply.

16. The library, as claimed in claim 11, wherein: said power controller is adapted to cause a delay in the application of power to said component by controlling an output of said power supply.

17. The library, as claimed in claim 11, wherein: said power controller is adapted to cause said delay in the application of power to said component by communicating with said component via a network.

18. A robotic data storage library with soft power capability, the library comprising: a plurality of storage locations, each capable of holding at least one data storage element; a data transfer interface for receiving said data storage element and establishing a communication path with said data storage element so that data can be transferred between the data storage element and a host computer; a transport unit for moving said data storage element between one of said plurality of storage locations and said data transfer interface; a power supply for providing power to a component of the library; a power switch switchable between an ON state and an OFF state; a power controller for monitoring said power switch for a transition from said ON state to said OFF state and after detecting said transition of said power switch from said ON state to said OFF state, issuing a power termination message to said component concerning termination of power applied to said component.

19. The library, as claimed in claim 18, wherein: said power controller comprises means for terminating the application of power to said component after a fixed amount of time has expired since issuing said power termination message to said component.

20. The library, as claimed in claim 18, wherein: said power controller comprises means for terminating the application of power to said component after a variable amount of time has expired since issuing said power termination message to said component.

21. The library, as claimed in claim 20, wherein: said means for terminating comprises means for changing said variable amount of time from a first value to a second value that is greater than said first value if a request for an extension of time is received from said component before expiration of said variable amount of time when said variable amount of time has said first value.

22. The library, as claimed in claim 21, wherein: said means for terminating comprises means for issuing a revised power termination message to said component indicating a change in said variable time from said first value to said second value.

23. The library, as claimed in claim 18, wherein: said power supply provides power to said power controller independent of supplying power to said components.

24. The library, as claimed in claim 18, wherein: said power controller comprises non-volatile data storage for storing a boot-strap program.

25. The library, as claimed in claim 18, wherein: said power controller comprises a network for communicating with said component.

26. The library, as claimed in claim 25, wherein: said network comprises a Control Area Network.

27. The library, as claimed in claim 25, wherein: said network comprises an Inter Integrated Circuit network.

28. The library, as claimed in claim 18, wherein: said power controller comprises means for monitoring the power output by said power supply.

29. The library, as claimed in claim 18, further comprising: a second plurality of storage locations for storing additional data storage elements; a second drive; a second power supply for providing power to a second component of the library; and a slave power controller for receiving a master-slave message from said power controller, wherein said slave power controller controls power applied to said second component of the library after receiving said master-slave message from said power controller.

30. The library, as claimed in claim 29, wherein said master-slave message comprises said termination message.

31. A method for providing soft power capability in a robotic data storage library comprising: providing a data storage library comprising a plurality of storage locations, each capable of holding at least one data storage element, a data transfer interface for receiving a data storage element and establishing a communication path with said data storage element so that data can be transferred between the data storage element and a host computer, a transport unit for moving said data storage element between one of said plurality of storage locations and said data transfer interface, a power supply for providing power to a component of the library, and a power switch switchable between an ON state and an OFF state; monitoring said power switch for a transition between said ON state and said OFF state; and controlling power applied to said component after detecting said transition between said ON state and said OFF state.

* * * * *